(12) United States Patent
Sathaye et al.

(10) Patent No.: US 7,984,263 B2
(45) Date of Patent: *Jul. 19, 2011

(54) STRUCTURE FOR A MEMORY-CENTRIC PAGE TABLE WALKER

(75) Inventors: Sumedh W. Sathaye, Austin, TX (US); Gordon T. Davis, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 426 days.

This patent is subject to a terminal disclaimer.

(21) Appl. No.: 12/109,671

(22) Filed: Apr. 25, 2008

(65) Prior Publication Data

US 2009/0158003 A1  Jun. 18, 2009

Related U.S. Application Data

(63) Continuation-in-part of application No. 11/956,625, filed on Dec. 14, 2007.

(51) Int. Cl.
*G06F 12/00* (2006.01)
(52) U.S. Cl. .. 711/206; 711/207; 711/138; 711/E12.059
(58) Field of Classification Search .................. 711/138, 711/206–207, E12.059
See application file for complete search history.

(56) References Cited

U.S. PATENT DOCUMENTS

| | | | |
|---|---|---|---|
| 5,960,463 A * | 9/1999 | Sharma et al. | 711/206 |
| 6,012,132 A | 1/2000 | Yamada et al. | |
| 6,088,780 A | 7/2000 | Yamada et al. | |
| 6,741,258 B1 * | 5/2004 | Peck et al. | 345/568 |
| 7,353,445 B1 * | 4/2008 | Barreh et al. | 714/758 |
| 7,363,491 B2 * | 4/2008 | O'Connor | 713/166 |
| 2002/0065989 A1 * | 5/2002 | Chauvel et al. | 711/130 |
| 2003/0079103 A1 * | 4/2003 | Morrow | 711/206 |
| 2005/0268095 A1 * | 12/2005 | O'Connor | 713/167 |
| 2006/0136680 A1 * | 6/2006 | Borkenhagen et al. | 711/154 |
| 2006/0224815 A1 | 10/2006 | Yamada et al. | |
| 2006/0259734 A1 | 11/2006 | Sheu et al. | |
| 2006/0277357 A1 * | 12/2006 | Regnier | 711/6 |
| 2007/0038839 A1 * | 2/2007 | Hummel et al. | 711/207 |
| 2007/0038840 A1 * | 2/2007 | Hummel et al. | 711/207 |
| 2007/0168644 A1 | 7/2007 | Hummel et al. | |
| 2008/0209130 A1 * | 8/2008 | Kegel et al. | 711/135 |

OTHER PUBLICATIONS

Andrew S Tanenbaum, Structured Computer Organization, 1984, Prentice-Hall, Inc., second edition, p. 11.*
U.S. Appl. No. 11/956,625, filed Dec. 14, 2007, entitled, "Memory-Centric Page Table Walker,".

* cited by examiner

*Primary Examiner* — Shane M Thomas
(74) *Attorney, Agent, or Firm* — Patterson & Sheridan, LLP

(57) ABSTRACT

A design structure embodied in a machine readable storage medium for at least one of designing, manufacturing, and testing a design is provided. The design structure includes a page table walker. The page table walker is moved from its conventional location in the memory management unit associated with the data processor to a location in main memory i.e. the main memory controller. As a result, wherein the processing of requests for data could selectively avoid or bypass cumbersome caches associated with the data processor.

2 Claims, 3 Drawing Sheets

Enhanced Processor System with Memory-Centric Page Table Walker

Figure 1: Typical Processor System

Figure 2: Enhanced Processor System with Memory-Centric Page Table Walker

STRUCTURE FOR A MEMORY-CENTRIC PAGE TABLE WALKER

CROSS-REFERENCE TO RELATED APPLICATION

This application is a continuation-in-part of co-pending U.S. patent application Ser. No. 11/956,625, filed Dec. 14, 2007, which is herein incorporated by reference.

BACKGROUND OF THE INVENTION

Technical Field

The present invention relates to design structures, and more specifically, design structures for computer memory management, particular to page tables in such memories and more particularly to page table walkers.

Memory addressing in the computer's main memory, i.e. the fast semiconductor storage (RAM) directly connected to the computer processor, conventionally uses paging to implement virtual memory. During such paging, the virtual address space is divided into fixed size units or blocks called pages. Each page can be mapped to any physical address corresponding to a hardware location available in the system. Conventionally, a memory management unit (MMU) operates a selected paging algorithm to determine and maintain the current mappings from the virtual to physical addresses using one or more page tables. When an address is received from an execution unit in the processor, the MMU will translate virtual to physical address using the page tables. The page tables are conventionally stored in the main memory, and page table walker is invoked to access the page tables, and provide appropriate translation. The computer memory management art is always seeking implementations for improving speed and efficiency of page table walkers. The present invention provides an implementation for improving the speed and effectiveness of page table walkers.

In order to better understand the prior art status of page table walkers, reference is made to FIG. 1, which is a generalized representation of a conventional computer memory system comprising a page table 101 and a page table walker 102. The memory includes several cache levels 103-104 (i.e., L1 data cache 103 and L2 cache 104), a memory management unit (MMU) 105 for address translation, a system bus 106, a memory controller 107, and main memory (DRAM) 108. When the processor 110 executes memory access instructions (e.g. load, store), the processor 110 presents an "Effective Address" to the L1 data cache 103. The MMU 105 converts the "Effective Address" into a "Physical Address" required for accessing the data (including in some systems, an intermediate "Virtual Address"). Within the MMU 105, the SLB (Segment Lookaside Buffer) 111 supports translation from Effective Addresses to Virtual Addresses, and the TLB (Translation Lookaside Buffer) 112 supports translation from Virtual Addresses to Real Addresses. In some systems, ERATs (Effective-to-Real Translation) caches 113 and 114 cache a limited number of previous Effective-to-Real translations in anticipation of their reuse. If the required translation is found in an ERAT 113-114, the process within the MMU 105 can be bypassed. A similar process occurs when the processor fetches new instructions for execution. Once the physical address is determined, the physical address may be used to validate an entry found in the L1 instruction cache 115, or if no match is found in the L1 instruction cache 115, the physical address is presented to the L2 cache 104. In cases where there is also no match found in the L2 cache 104, the physical address is propagated to the memory subsystem to access the required data.

A unique address translation is required for each memory page; a page may contain 4 KBytes, 64 KBytes, or other larger amounts of DRAM 108 storage. The TLB 112 contains an entry for each of the most recently required translations, but occasionally an address will be presented to the MMU 105 that does not have a matching translation in the TLB 112. When no matching translation is found in the TLB 112, a TLB miss is declared, and the Page Table Walker 102 is activated to search the complete Page Table 101 stored in DRAM 108. The page table walker 102 typically includes a hash function, followed by one or more memory accesses, and the processing individual PTEs (page table entries) in the resulting data to locate the required PTE. Once the Page Table Walker 102 has retrieved the required Page Table Entry (PTE), this new PTE is used to complete the required address translation, and the pending memory access process continues as with normal accesses. The new PTE displaces another PTE within the TLB 112, based on time since last use. More specifically, a LRU (last recently used) mechanism similar to that used in caches determines which previous TLB 112 entry to displace.

A limitation in many existing implementation of page table walkers 102 is that the page table walker typically retrieves a full cache line of data from the page table 101 in DRAM, even though the required PTE is a fraction of that size. For example in the Power PC™ architecture, as many as eight PTE's fit within a 128 byte cache line. Moving eight times the required data across system buses from memory 108 to the MMU 105 results in unproductive power dissipation. If the desired entry is not found in the first memory access, a second access may be required, adding additional delay and power dissipation. Compounding this problem, each cache line fetched by the page table walker displaces some other cache line in the L2 cache 104, even though it is highly unlikely that the page table data will be used again while it is still in the cache.

It has been observed that page table data within the L2 cache 104 can adversely impact the L2 cache hit rate for normal user data. Therefore, it would be desirable to develop a way of updating the TLB 112 while avoiding the excess power dissipation as well as interference with user data in the L2 cache 104, as described hereinabove.

SUMMARY OF THE INVENTION

The present invention provides a solution which reduces the undesirable effects described above. In its broadest aspects, this invention involves the recognition that moving the page table walker from its conventional location in the memory management unit to a location in main memory i.e. the main memory controller, many of the above described effects could be minimized. As a result, an implementation is provided wherein the processing of requests for data could selectively avoid or bypass cumbersome caches associated with the data processor.

The present invention provides a computer system comprising a data processor unit connected to a main memory in which the data processor unit includes a memory management unit for controlling the conversion of an address of requested data received from a processor into a physical address of said requested data; and in which, the main memory includes apparatus for storing the data being accessed in pages at the physical addresses, a page table accessed by the memory management unit for converting to said page addresses, and the page table walker for proceeding through the entries in said page table.

The main memory includes a random access memory (RAM), preferably DRAM and a memory controller for controlling said random access memory; and the memory controller contains the page table walker.

The data processor further includes at least one data cache for storing recently requested data and an apparatus in the associated memory management unit for checking received data requests against data stored in said cache. Moreover, the present invention provides an apparatus for selectively bypassing the cache so that a data request is connected directly to said page table walker in the memory controller for address conversion. This selective bypassing involves determining whether a data request checks for the requested data in the cache or whether a data request bypasses said cache and is connected directly to page table walker for conversion. This decision may be based upon whether there is a flag in the address of the requested data.

The present invention enables a plurality of processors connected to one main memory to use the same page table walker in the main memory.

In one embodiment, a design structure embodied in a machine readable storage medium for at least one of designing, manufacturing, and testing a design. The design structure generally includes a computer system that includes a data processor unit connected to a main memory, said data processor unit including a memory management unit for controlling the conversion of an address of requested data received from a processor into a physical address of said requested data. The main memory generally includes an apparatus for storing the data being accessed in pages at said physical addresses, a page table accessed by said memory management unit for converting to said page addresses, and a page table walker for proceeding through the entries on said page table.

In another embodiment, a design structure embodied in a machine readable storage medium for at least one of designing, manufacturing, and testing a design is provided. The design structure generally includes a main memory unit adapted for operative association with a data processor, said main memory unit that includes an apparatus for storing the data being accessed in pages at said physical addresses, a page table accessed by said memory management unit for converting to said page addresses, and a page table walker for proceeding through the entries in said page table.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF PREFERRED EMBODIMENTS

Figure 1:
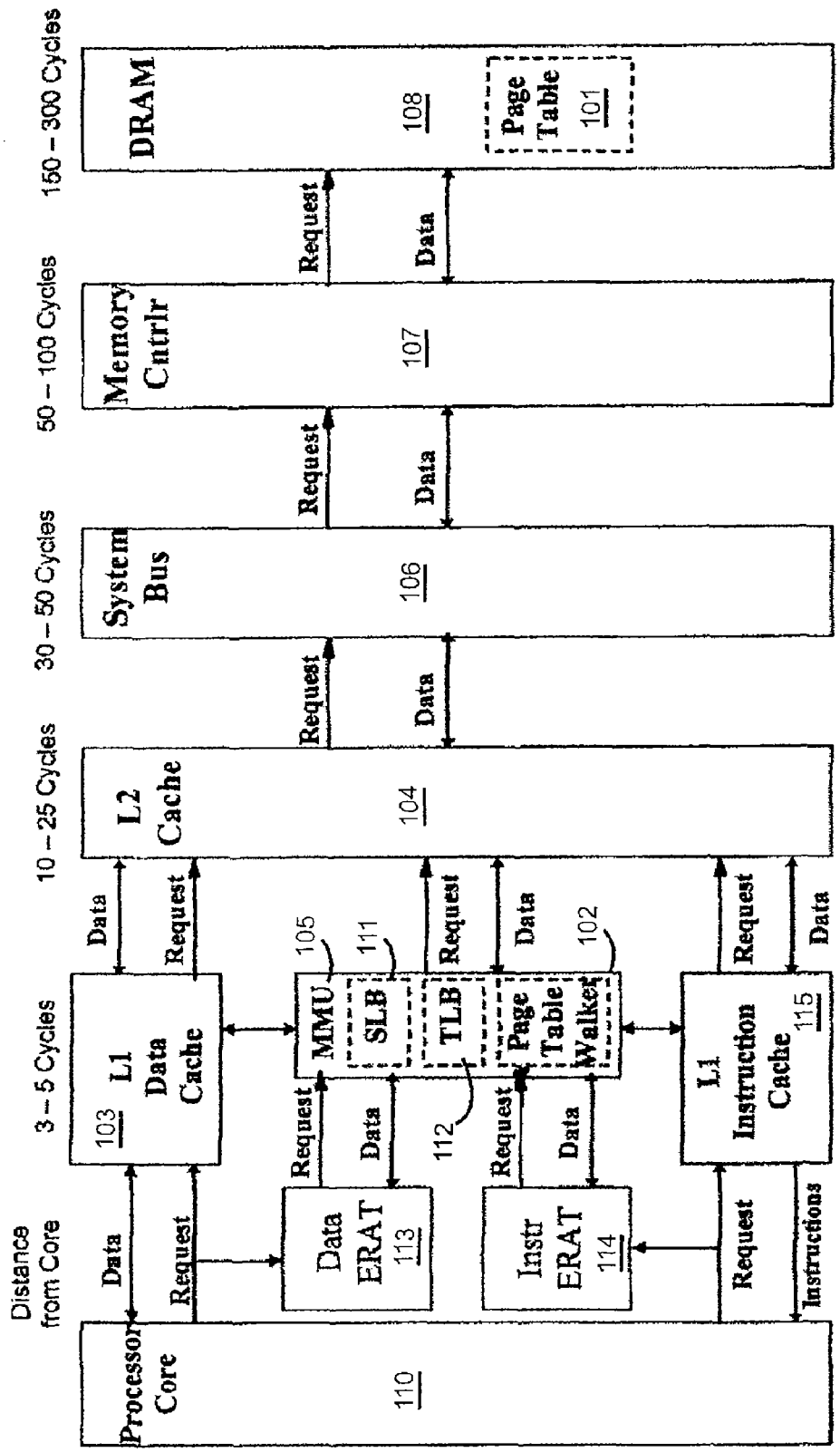
FIG. 1 shows a generalized view of a conventional main memory and an associated processor unit in the prior art.

FIG. 1 showing the prior art has been described hereinabove in the background of the invention.

Figure 2:
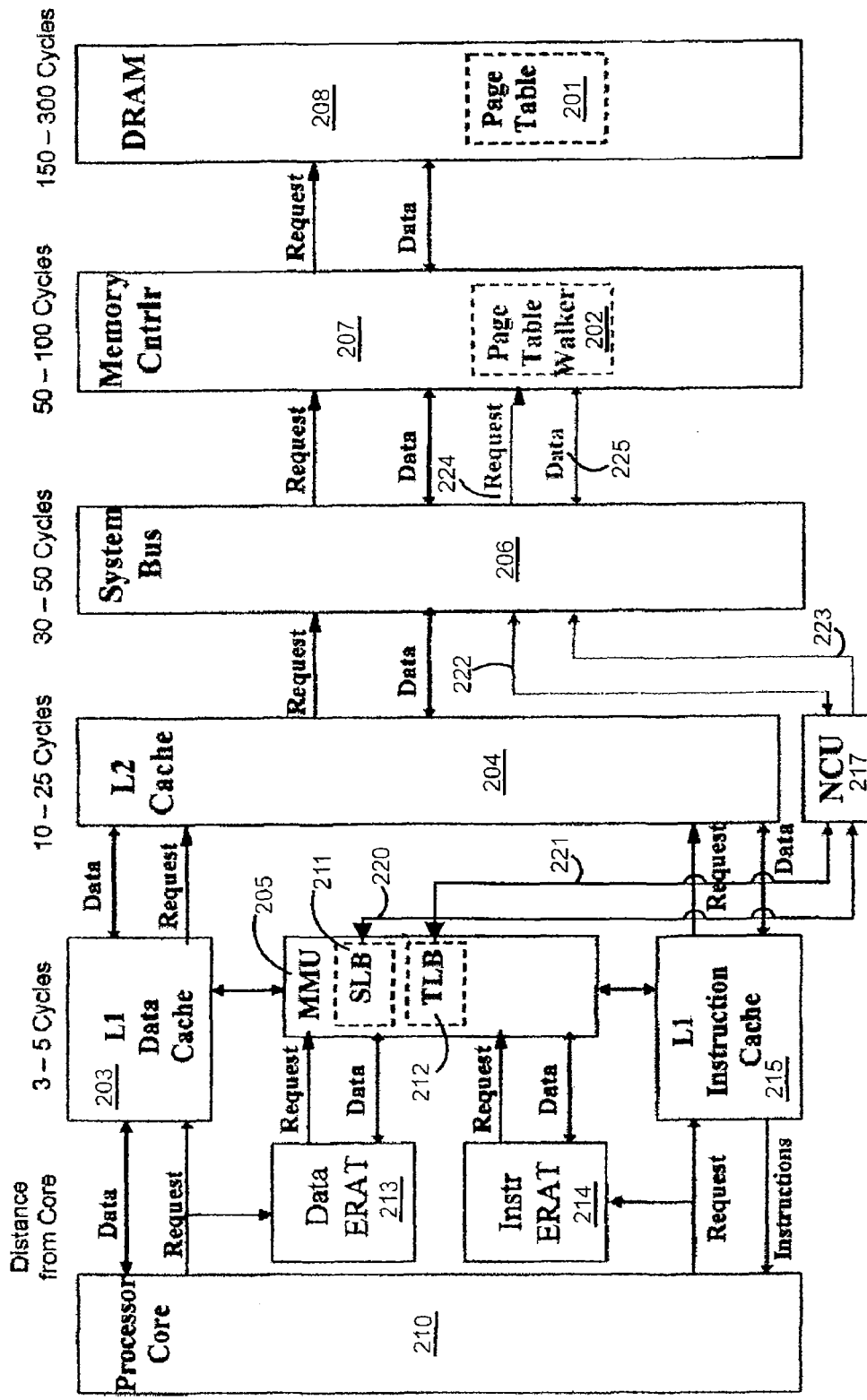
FIG. 2 shows a generalized embodiment of the main memory and an associated processor unit in the present invention.

FIG. 2 shows an embodiment of the present invention. In general, the following elements in the embodiment illustrated in FIG. 2 perform the same functions that the corresponding elements perform in the prior art embodiment described hereinabove with respect to FIG. 1: Processor Core 210, Data ERAT 213, Instruction ERAT 214, L1 Data Cache 203, L1 Instruction 215, L2 Cache 204, System Bus 206, Memory Controller 207, DRAM 208, and Page Table 201. Comparing FIG. 2 with FIG. 1, it can be seen that the Page Table Walker 202 has been removed from the MMU 205 and has been placed within the Memory Controller 207. Moreover, Non Cache Unit (NCU) 217 has been added, which serves as a cache bypass. More specifically, NCU 217 bypasses the L2 Cache 204. Additionally, a path has been added from the MMU 205 to the Page Table Walker 202 within the Memory Controller 207 in order to route a page data request. The request path provides a route from the MMU 205 to the Page Table Walker 202 within the Memory Controller 207 via request line 221, NCU 217, request line 222, System Bus 206, and request line 224. When a TLB (translation lookaside buffer) 212 "miss" is detected, the MMU 205 generates a non-cacheable read request (i.e., a page data request) using the Virtual Address (or Effective Address if there is no SLB (segment lookaside buffer) 211) of the pending memory access as the address of the non-cacheable read. This request may be flagged via a special command code, inserted into the page data request, as a Page Table only search. As a result of the flag, the page data request is routed via NCU 217 along the request path described above. Once the request reaches the Page Table Walker 202, any virtual address is hashed, a memory block is accessed, and the memory block is scanned for a PTE (page table entry) that matches the Virtual Address. Upon identification of the desired PTE, the entry is returned as the response to the request via a page data path. The page data path provides a route from the DRAM 208 to the MMU 205 via data line 225, System Bus 206, data line 223, NCU 217, and data line 220.

The page table walker embodiment shown in FIG. 2 may be adapted to a multi-processor system, wherein a single page table is shared among all processors in order to avoid conflicting uses of memory segments. Such an arrangement would enable multiple processors to share a single page table walker. Even in large systems with multiple memory controllers, a page table can be fit within a single DRAM, and thus the page table walker need only to be included within the one memory controller for the DRAM containing the Page Table.

For circuit development purposes, the processor 210, MMU 205, NCU 217 and all of the caches may be integrated into a semiconductor chip separate from the semiconductor chip incorporating memory controller 207 and DRAM 208.

In some existing non-homogeneous systems, a full-function processor may control multiple special purpose processors. In some cases, the complexity of a full MMU (memory management unit) is removed from the special purpose processors, and the full-function processor takes on the responsibility of handling TLB updates on the special purpose devices via appropriate software. This adds significant latency and overhead. The present invention may enable these special purpose processors to update their TLBs by using the main processor's memory table walker. This enables the special purpose processors to remain simple, but at the same time avoids the latency of a software update.

The page table walker may include an enhanced function to anticipate the need of the next sequential page, and complete the page table walk to access the corresponding PTE (page table entry). Such an anticipated PTE could be cached in a single entry cache within the page table walker. In the case of a page table walker supporting multiple processors, this PTE cache could include one entry for each processor. This prefetch action could be configured to always acquire the next sequential PTE (i.e. via setting a configuration bit), or it could be triggered by detecting two consecutive page table walks from the same core that has accessed PTE's for sequential pages. It should be noted that fast access should be possible most of the time to the PTEG (page table entry group) containing the PTE for the next sequential page since the hash used for the page table should place PTE's for sequential pages in sequential PTEG positions.

Figure 3:
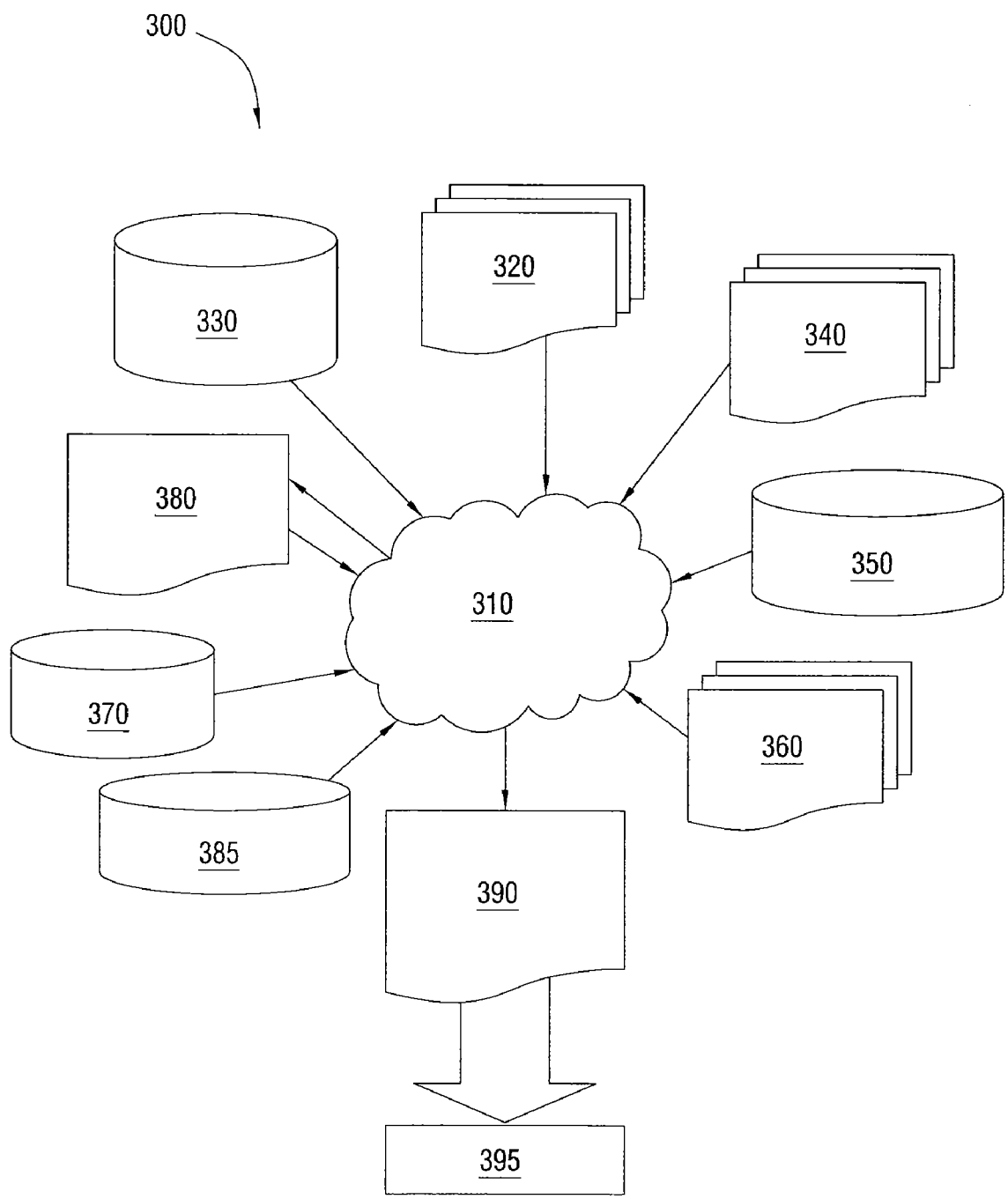
FIG. 3 shows a flow diagram of a design process used in semiconductor design, manufacture, and/or test.

FIG. 3 shows a block diagram of an exemplary design flow 300 used for example, in semiconductor design, manufacturing, and/or test. Design flow 300 may vary depending on the type of IC being designed. For example, a design flow 300 for building an application specific IC (ASIC) may differ from a design flow 300 for designing a standard component. Design structure 320 is preferably an input to a design process 310 and may come from an IP provider, a core developer, or other design company or may be generated by the operator of the design flow, or from other sources. Design structure 320 comprises the circuit described above and shown in FIG. 2 in the form of schematics or HDL, a hardware-description language (e.g., Verilog, VHDL, C, etc.). Design structure 320 may be contained on one or more machine readable medium. For example, design structure 320 may be a text file or a graphical representation of a circuit as described above and shown in FIG. 2. Design process 310 preferably synthesizes (or translates) the circuit described above and shown in FIG. 2 into a netlist 380, where netlist 380 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 380 is resynthesized one or more times depending on design specifications and parameters for the circuit.

Design process 310 may include using a variety of inputs; for example, inputs from library elements 330 which may house a set of commonly used elements, circuits, and devices, including models, layouts, and symbolic representations, for a given manufacturing technology (e.g., different technology nodes, 32 nm, 45 nm, 90 nm, etc.), design specifications 340, characterization data 350, verification data 360, design rules 370, and test data files 385 (which may include test patterns and other testing information). Design process 310 may further include, for example, standard circuit design processes such as timing analysis, verification, design rule checking, place and route operations, etc. One of ordinary skill in the art of integrated circuit design can appreciate the extent of possible electronic design automation tools and applications used in design process 310 without deviating from the scope and spirit of the invention. The design structure of the invention is not limited to any specific design flow.

Design process 310 preferably translates a circuit as described above and shown in FIG. 2, along with any additional integrated circuit design or data (if applicable), into a second design structure 390. Design structure 390 resides on a storage medium in a data format used for the exchange of layout data of integrated circuits (e.g. information stored in a GDSII (GDS2), GL1, OASIS, or any other suitable format for storing such design structures). Design structure 390 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIG. 2. Design structure 390 may then proceed to a stage 395 where, for example, design structure 390: proceeds to tape-out, is released to manufacturing, is released to a mask house, is sent to another design house, is sent back to the customer, etc.

Although certain preferred embodiments have been shown and described, it will be understood that many changes and modifications may be made therein without departing from the scope and intent of the appended claims.

What is claimed is:

1. A design structure embodied in a machine readable storage medium for at least one of designing, manufacturing, and testing a design, said design structure comprising:
   a computer system comprising:
   a memory management unit for controlling an address conversion, said address conversion translating an address received from a processor to a physical address;
   a main memory unit connected to said memory management unit, said main memory unit comprising:
   main memory comprising a page table accessed by said memory management unit for an address conversion;
   a memory controller for controlling said main memory, wherein said memory controller comprises a page table walker for proceeding through entries of said page table;
   cache circuitry for storing recently requested data;
   a first apparatus for routing a page data request between said memory management unit and said page table walker, whereby said cache circuitry is bypassed; and
   a second apparatus for determining whether a page data request is to be routed via said first apparatus, wherein said second apparatus determines whether said page data request is to be routed via said first apparatus based upon a flag in said page data request.

2. A design structure embodied in a machine readable storage medium for at least one of designing, manufacturing, and testing a design, said design structure comprising:
   a computer system comprising:
   a memory management unit for controlling an address conversion, said address conversion translating an address received from a processor to a physical address;
   a main memory unit comprising:
   main memory comprising a page table accessed by said memory management unit for an address conversion; and
   a memory controller for controlling said main memory, wherein said memory controller comprises a page table walker for proceeding through entries in said page table;
   cache circuitry for storing recently requested data;
   a first apparatus for routing page data between said main memory and said memory management unit, whereby said cache circuitry is bypassed;
   a second apparatus for routing a page data request between said memory management unit and said page table walker, whereby said cache circuitry is bypassed; and
   a third apparatus for determining whether a page data request is to be routed via said second apparatus, wherein said third apparatus determines whether said page data request is to be routed via said second apparatus based upon a flag in said page data request.

* * * * *